June 8, 1965   H. J. HANSEN   3,188,123
TUBE COUPLING
Filed May 5, 1961

INVENTOR.
HOWARD J. HANSEN
BY
Williams, David, Hoffmann & Yount
ATTORNEYS

United States Patent Office 3,188,123
Patented June 8, 1965

3,188,123
TUBE COUPLING
Howard J. Hansen, Bay Village, Ohio, assignor to The Hansen Manufacturing Company, Cleveland, Ohio, a corporation of Ohio
Filed May 5, 1961, Ser. No. 107,959
2 Claims. (Cl. 285—277)

The present invention relates to a coupling and, more particularly, to a coupling which is quickly attachable to and detachable from the end of a tube having a plurality of annular shoulders thereon which are spaced from each other.

In certain applications, it is desirable to make a fluid connection to a tube which has a plurality of spaced annular projections adjacent the end thereof to which the connection is to be made. Problems have been encountered in making fluid-tight connections of tubes of this type with a quick-disconnect coupling since such couplings use sealing rings to make the connection fluid-tight and the insertion of the tube has tended to destroy the seal rings.

Accordingly, an important object of the present invention is to provide a new and improved socket-type coupling for making a fluid-tight connection to a tube having a plurality of annular shoulders on the end portion of the tube received by the coupling, with the coupling being so constructed and arranged that the insertion of the tube into the coupling does not adversely affect the seal ring for making a seal between the internal wall of the socket receiving the tube and the exterior of the tube.

Another object of the present invention is to provide a new and improved socket-type coupling of the quick-disconnect type for making a fluid-tight connection to a tube having a plurality of spaced annular shoulders on the end received by the coupling, with the coupling being so constructed and arranged that the end of the tube received in the coupling is supported against lateral movement relative to the coupling.

Figure 1:
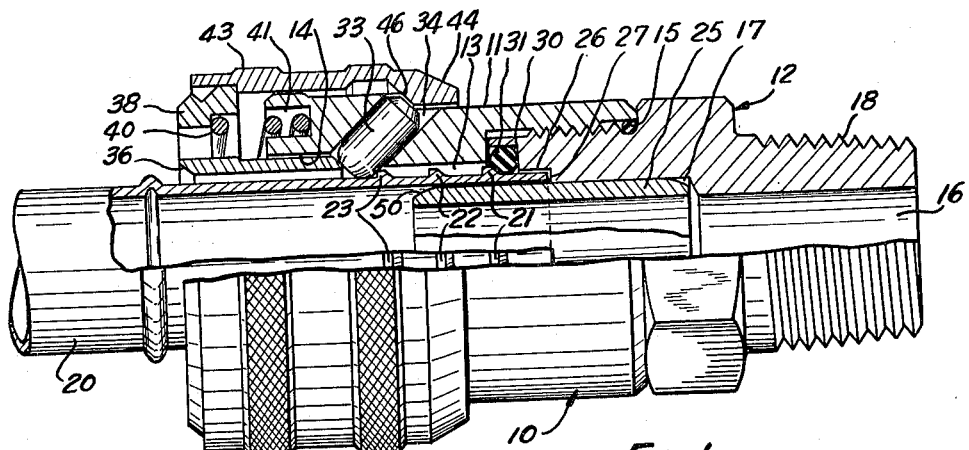
Figure 2:
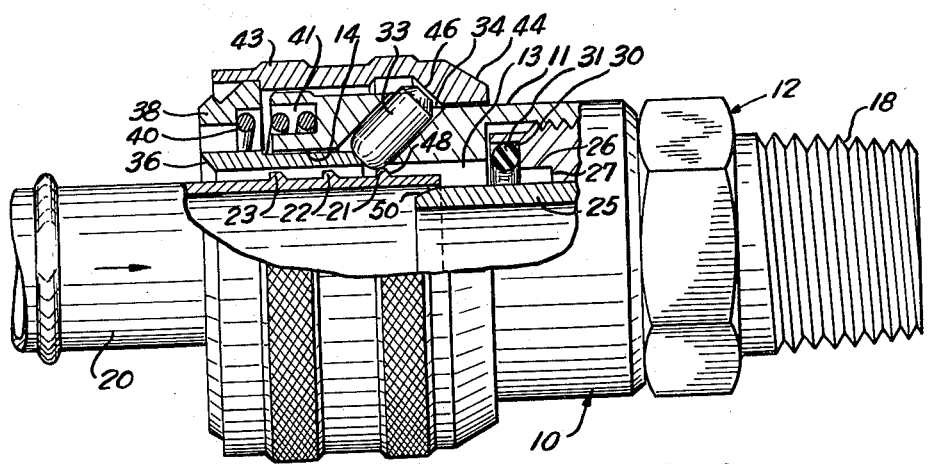

Further objects and advantages of the present invention will become apparent from the following detailed description thereof made with reference to the accompanying drawings forming a part of the present specification and in which:

FIG. 1 is a side elevational view of a coupling embodying the present invention with parts thereof cut away; and FIG. 2 is a view corresponding to FIG. 1 but showing the tube in a partially inserted position.

In accordance with the present invention, a coupling is provided which comprises a socket member having an opening therethrough which is adapted at one end to receive one end of a tube to which a connection is to be made, the tube having a plurality of spaced annular shoulders on the end portion received by the socket member and the socket member having shoulder means extending inwardly of the opening therein to form a stop to limit the insertion of the tube to a predetermined position and further comprising a resilient sealing ring adapted to seal on the periphery of the tube and against the annular shoulder which is the leading one of the shoulders as the tube is inserted, and detent means, preferably of the pin type, which are adapted to engage the trailing side of a shoulder spaced from the leading shoulder when the tube is in the predetermined position to hold the tube in the socket, the socket member further comprising an internal support member coaxial with the opening through the socket member and which extends from the shoulder means toward the end into which the tube is inserted and is adapted to be received within the tube as it is inserted to guide and support the tube.

Referring to the drawings, the preferred and illustrated embodiment of the present invention comprises a coupling including a socket member 10 comprised of a body member 11 and a plug member 12. The body member 11 is a tubular member having an opening 13 therethrough, the opening 13 being counterbored at the left-hand end, as the latter is viewed in FIG. 1, to provide an enlarged opening 14, and at its right-hand end, to provide a counterbore 15. The plug member 12 threads into the counterbore 15 and has an opening 16 therethrough which communicates with the opening 13, with the opening 16 being counterbored at the end thereof adjacent the opening 13 to provide an enlarged opening 17. The projecting end of the plug member 12 is externally threaded, as indicated by the reference numeral 18, for connection to a conduit or hose.

The socket member illustrated in the drawings is adapted to make a fluid-tight connection to a tube 20 having a plurality of spaced annular shoulders 21, 22, 23 on the end thereof which is to be received in the socket member 10, the shoulders 21, 22, 23 extending outwardly from the outside periphery of the tube. The opening 13 in the body member 11 has a diameter adapted to receive the outside diameter of the annular shoulders 21, 22, 23, while the diameter of the opening 17 of the plug member 12 is substantially the same as the inside diameter of the tube 20. An internal support 25 is pressed into the opening 17 and extends from the opening 17 into the opening 13 in the body member 11 and is coaxial therewith so as to be received in the tube 20 as the latter is inserted into the socket member 10. A counterbore 26 is provided at the end of the opening 17 adjacent the opening 13 and the counterbore 26 is adapted to receive the leading end of the tube 20 with the diameter of the counterbore 26 being slightly greater, in the preferred embodiment, than that of the tube 20. The junction of the counterbore 26 and the opening 17 provides a shoulder 27 which functions as a stop to limit the insertion of the tube 20 to a predetermined position. To provide a seal between the tube 20 and the socket member 10, the end of the plug member 12 received in the body member 11 is cut out to provide a groove 30 which opens into the end of the plug member 12 and into the side of the opening 26 and a sealing ring 31 is disposed in the groove 30 and is adapted to seal against the forward side of the annular shoulder 21 and against the outer periphery of the tube 20 immediately forward of the shoulder 21 when the tube 20 is inserted to the position shown in FIG. 1.

When the tube is inserted to the position shown in FIG. 1, detent means cooperate with the shoulder 23 to lock the tube in position so that it cannot be accidentally withdrawn. In the preferred and illustrated embodiment, the detent means comprises a plurality of detents 33 in the form of pins which are received in bores in the body member 20 with the bores lying in diametrical planes of the body member 11. Only one pin 33 and its receiving bore 34 are shown in the drawing, but it is understood that a plurality of such pins are provided in bores which are spaced angularly about the body member 11. The bores 34 open into the outer periphery of the body member 11 and into the opening 13 and when proceeding outwardly from the opening 13, the bores are inclined in the direction of insertion of the tube 20 so that the end of the pin 33 is tipped so that it faces the end of the socket member from which the tube 20 is inserted.

As pointed out hereinbefore, the opening 13 is enlarged at the end of the body member 11 which receives the tube 20, and an inner sleeve 36 for operating the pins 33 is positioned in the opening 14. The interior diameter of the inner sleeve 36 is substantially that of the opening 13 and is adapted to receive the annular shoulders 21, 22, 23. The sleeve 36 extends outwardly of the body member 11 and carries a flange 38 which is fixed to the outer end of the sleeve 36 and forms an abutment or backstop for a spring 40 which is interposed between the flange 38 and the body member 11. The left-hand end of the body member 11, as the latter is viewed in FIG. 1, is provided with a groove 41 which forms a seat for the spring 40. The spring urges the flange 38 and, in turn, the sleeve 36 outwardly away from the body member 11 and the movement of these parts away from the body member 11 is limited by a sleeve 43 which is fixed to the outer periphery of the flange 38 and which telescopes over the body member 11 and extends forwardly on the body member 11 to a point inwardly of the pins 33. The sleeve 43 is free to move relative to the body member 11 but has an inner portion 44 of reduced diameter. The portion of the body member 11 rearwardly of the pins 33 is of larger diameter than the portion of the body member 11 forwardly of the pins to provide a shoulder 46 against which the portion 44 of reduced diameter on the sleeve 43 will abut to limit the movement of the sleeve 43, the flange 38, and the inner sleeve 36 outwardly away from the body member 11. The reduced portion 44 of the sleeve 43 also engages the pins 33 which are, in effect, trapped between the inner end of the interior sleeve 36 and the inside of the reduced portion 44 of the sleeve 43, so that as the sleeve is reciprocated, the pins will move inwardly and outwardly of the bores 34 to move into and out of locking position. When the pins 33 move outwardly of the bores, as shown in FIG. 2, the annular shoulders 21, 22, 23 may move past the pins.

It will be noted that the leading sides of the shoulders 21, 22, 23 when the tube is inserted have a slight taper thereon to provide tapered surfaces 48 which will engage the end of the pins 33 and push the pins 33 outwardly, moving the sleeves 36, 43 inwardly, so that the shoulders 21, 22, 23 may move past the pins as the tube is inserted. After the tube has been inserted or after a shoulder has moved by the pins, the spring 40 will return the sleeves 43, 36 to cause the pins 33 to move inwardly to their locking position shown in FIG. 1. The edge of the pins between the bottom and the side walls thereof is preferably rounded to facilitate the camming action by the shoulders 21, 22, 23.

As the tube is inserted to position, the leading end thereof will move over the end of the pilot member 25 and preferably this end of the pilot member 25 is radiused, as indicated at 50, to facilitate the guiding of the tube 20 into position. It has been found that with the described structure, the tube is supported and guided so that it can be inserted into the socket member without seriously damaging the sealing ring 30 and that, when inserted, is supported against wobbling relative to the socket member even though there is no support for the outer periphery of the tube. Even if the insertion of the tube nicks the seal ring 31, the joint will not normally leak. The ring 31 seals against both the shoulder 21 and the portion of the tube immediately forward of the shoulder so that a nick has to destroy both seals before the connection will leak.

It can now be seen that the present invention provides a new and improved coupling for making a fluid-tight connection to a tube, which has a plurality of spaced annular shoulders extending outwardly from the periphery of the tube at the end of the tube to which the connection is to be made so that the tube cannot be conveniently supported in the coupling, by means which engages the outside periphery of the tube. Furthermore, construction of the coupling is such that an O-ring for making a seal between the coupling and the tube has relatively long life as compared to O-rings of known couplings.

While a preferred embodiment of the present invention has been described in considerable detail, it is hereby my intention to cover all constructions, modifications, and arrangements which fall within the ability of those skilled in the art and within the scope and spirit of the appended claims.

Having described my invention, what I claim is:

1. A coupling for a tube having a forward end and a tube annular shoulder extending outwardly therefrom inwardly of said forward end, said tube annular shoulder having a forward side facing said forward end, said coupling comprising a socket member having an opening therethrough adapted to receive the forward end portion of said tube by insertion of said tube into said opening at one end of said socket member, said coupling having inwardly extending shoulder means in said opening spaced from said one end and adapted to limit the inward movement of said tube to a predetermined position in which said tube annular shoulder on said tube is received in said socket member, a sealing ring extending inwardly of the opening in said socket member and disposed in spaced relation to said inwardly extending shoulder means in said socket member to receive said tube and seal against the outer periphery thereof adjacent the forward side of said tube annular shoulder when said tube is in said predetermined position, locking means for releasably locking said tube in said coupling comprising a plurality of detents supported in apertures in said socket member for movement inwardly and outwardly of the side wall of the opening through said socket member and adapted to move inwardly of the side wall of the opening through said socket member to a locking position immediately adjacent the trailing side of said tube annular shoulder to cooperate with said trailing side of said tube annular shoulder to hold said tube against withdrawal when said tube is in said predetermined position, and means for releasably holding said detent means against movement outwardly from their locking position, and an internal support member coaxially disposed with said opening and extending from said shoulder means through and beyond said sealing ring and having an external diameter approximately that of the internal diameter of the tube whereby said support member is received in said tube as said tube is inserted into said socket member and said sealing ring.

2. In a coupling, an annular socket member having inwardly extending shoulder means and adapted to receive at one end in coupling relation against the shoulder means the forward end of a tube having an annular shoulder extending outwardly from the tube and which is adjacently spaced from the forward end of the tube, a sealing ring disposed within the socket member and spaced from said shoulder means, an internal pilot support member coaxially disposed within the socket member and within the sealing ring and axially extending from the shoulder means through and beyond the sealing ring toward said one end of the socket member, said pilot member having an external diameter approximately equal to the internal diameter of said tube and being adapted to be received within the forward end of the tube as the latter is inserted into said annular socket member to guide it through said sealing ring to the shoulder means.

References Cited by the Examiner

UNITED STATES PATENTS

| | | | |
|---|---|---|---|
| 751,345 | 2/04 | Saunders. | |
| 820,774 | 5/06 | Flyberg | 285—276 |
| 928,055 | 7/09 | Johnson et al. | 285—317 |
| 2,092,116 | 9/37 | Hansen. | |
| 2,518,542 | 8/50 | Hansen | 285—316 |
| 2,956,819 | 10/60 | Sies | 285—354 |

FOREIGN PATENTS 641,315   8/50   Great Britain.

CARL W. TOMLIN, *Primary Examiner.*